US005412381A

United States Patent [19]

Dicks

[11] Patent Number: 5,412,381

[45] Date of Patent: May 2, 1995

[54] SIGNALLING MEANS

[75] Inventor: Martin E. Dicks, Everton, England

[73] Assignee: Astucia-Sociedade de Desenvolvimiento de Patentes, LDA, Funchal

[21] Appl. No.: 79,636

[22] Filed: Jun. 18, 1993

[30] Foreign Application Priority Data

Jul. 8, 1992 [GB] United Kingdom ................. 9214474
Mar. 12, 1993 [GB] United Kingdom ................. 9305080

[51] Int. Cl.$^6$ ................................................ B60Q 7/00

[52] U.S. Cl. ................................ 340/908.1; 340/933; 340/332; 340/981; 340/983; 340/985; 404/12

[58] Field of Search ..................... 340/908.1, 908, 932, 340/933, 981, 983, 985, 331, 332; 404/12

[56] References Cited

U.S. PATENT DOCUMENTS

| | | | |
|---|---|---|---|
| 2,949,531 | 8/1960 | Lemelson | 340/908.1 |
| 3,302,168 | 1/1967 | Gray et al. | 340/932 |
| 3,529,284 | 9/1967 | Villemain | 340/932 |
| 3,544,959 | 12/1967 | Hawks | 340/932 |
| 3,720,913 | 3/1973 | Bradford | 340/933 |
| 3,750,099 | 7/1973 | Proctor | 340/932 |
| 3,846,672 | 11/1974 | Doughty | 340/908 |
| 3,886,352 | 5/1975 | Lai | 340/942 |
| 4,117,457 | 9/1978 | Latta | 340/432 |
| 4,203,091 | 5/1980 | Kruskopf | 340/908.1 |
| 4,249,160 | 2/1981 | Chilvers | 340/471 |
| 4,290,047 | 9/1981 | Latta | 340/435 |
| 4,292,627 | 9/1981 | Knight | 340/908 |
| 4,573,766 | 3/1986 | Bournay et al. | 340/716 |
| 4,841,278 | 6/1989 | Tezuka et al. | 340/908.1 |
| 4,884,017 | 11/1989 | Williams | 340/908.1 |
| 4,904,998 | 2/1990 | Niimi | 340/908.1 |
| 4,925,335 | 5/1990 | Eigenmann | 404/12 |
| 5,005,004 | 4/1991 | Udofot | 340/432 |
| 5,074,706 | 12/1991 | Paulos | 404/12 |
| 5,113,175 | 5/1992 | Adell | 340/472 |
| 5,119,067 | 6/1992 | Adell | 340/471 |
| 5,166,681 | 11/1992 | Bottesch et al. | 340/933 |
| 5,252,893 | 10/1993 | Chacham et al. | 340/908.1 |

FOREIGN PATENT DOCUMENTS

| | | | |
|---|---|---|---|
| 0144458 | 6/1985 | European Pat. Off. | 340/908.1 |
| 2750238 | 5/1979 | Germany | 340/908.1 |

*Primary Examiner*—John K. Peng
*Assistant Examiner*—Nina Tong
*Attorney, Agent, or Firm*—Trexler, Bushnell, Giangiorgi & Blackstone, Ltd.

[57] ABSTRACT

The invention relates to signalling, particularly road signalling, means. A considerable variety of illuminated and reflective signalling means are known to give advice to the driver of a particular vehicle and of great value to the driver of a vehicle during the hours of darkness on unlit roads or in inclement weather where mist and fog shroud a road. Such known signalling means cannot satisfy the important need to give advice to a driver of a vehicle of the presence of another vehicle closely ahead, and which is of particular importance in misty or foggy conditions. The primary objective of the invention is to provide a signalling means that can satisfy this requirement, which objective is met by a construction comprising at least one means (7, C3) able to be charged by light from a vehicle headlight, and a visible signal means (8; 13, 15) connected to and activated by said chargeable means (7, C3), and whereby on being charged, said chargeable means (7, C3) activates said signal means (8; 13, 15) for a discrete period of time after said headlight has ceased to illuminate said chargeable means (7, C3) and until said chargeable means (7, C3) has discharged. As a result, a trail of signals is permanently provided behind a lead vehicle to give warning to a vehicle behind of its presence and to a distance that constitutes a safe braking distance.

14 Claims, 7 Drawing Sheets

SIGNALLING MEANS

This invention relates to signalling means and is particularly concerned with signalling means for roads.

The advantage to drivers of motor vehicles of the provision of road signalling means has long been recognised. Whilst a considerable variety of illuminated signals have been proposed, it remains that the most effective form is the provision of reflective studs, to reflect a vehicle headlight back to a driver, to provide a clear indication of the centre of ordinary roads, and the positions of lanes on dual carriageways or motorways.

Thus, on badly lit roads or where there is the complete absence of road lighting, and more particularly in inclement weather where mist and fog shroud a road, the presence of road reflecting studs is of considerable benefit to the driver, in maintaining the vehicle correctly positioned on the road, and indicating to the driver the positions of bends and corners. Their shortcoming is that they can only serve the purpose of signalling the driver of any one vehicle.

The object of the present invention is to provide road signalling means not only able to serve those purposes mentioned above but additionally to provide advice to other road users of the presence of other road users. A secondary object of the invention is to provide road signalling means able to provide advice to road users of a particular danger ahead.

According to the present invention, road signalling means comprises a means able to be charged by light from a vehicle headlight, and a visible signal means connected to and activated by said chargeable means, and whereby on being charged, said chargeable means activates said signal means for a discrete period of time after said headlight has ceased to illuminate said chargeable means and until said chargeable means has discharged.

Thus the means able to be charged may comprise a relatively simply solar cell to receive light from a headlight, and to charge such as a capacitor. The visible signal means can be a lamp means e.g. a bulb connected to the capacitor that remains illuminated until the capacitor has discharged. Alternatively, the lamp means may be a light emitting diode. Preferably a flasher unit is provided between the capacitor and the lamp means to generate a flashing signal.

In place of a lamp means, bulb or LED, the signal means may be a reflector overlayed by a screen formed from liquid crystals. Here, the presence or absence of a charge on such as a capacitor, causes an orientation of the liquid crystals to allow or prevent the reflection of light. For example, with such as a capacitor charged on receiving light via a solar cell from a vehicle headlight, a charge may be applied from the capacitor to the screen to re-orient the liquid crystals to permit the passage of light, a condition that is held until the capacitor discharges. Thus, should a second vehicle reach the particular road signal means before its capacitor has discharged, the reflector is able to reflect that second vehicles headlight back to the driver to warn the driver of the presence in front of another vehicle. To enable such a signal means to serve as a normal reflector, a white or other required coloured reflector can be overlaid by a part of a liquid crystal screen that is transparent in the absence of a charge and rendered opaque by the presence of a charge, to close the white or other reflector as an orange or red sector of the reflector has its overlying part of the screen rendered transparent by the presence of a charge.

In its basic form, the road signalling means of the invention may be combined with a relatively conventional reflective means such as of the road stud type or of the type strategically located at the road side. Thus, and for example, in any circumstance where there is reduced visibility the reflective elements provide clear signals to a driver of a vehicle, and on the illumination of the means by the vehicles headlights the illumination of the bulb or the LED, or the rendering transparent of a liquid crystal screen provides a clear warning to a vehicle behind of the presence in front of another vehicle.

Following conventional practice such a bulb or LED, or a reflector would be coloured amber. In accordance with a further feature of the invention, a second bulb or LED, or a second reflector can be provided and following conventional practice be coloured red. Thus, in any circumstance where the amber bulb or LED is illuminated, or the screen overlying an amber reflector rendered transparent, and the capacitor has not discharged at the point where the headlights of a following vehicle play on the signalling means of the invention, the capacitor is provided with an overflow charge passed on to a second capacitor attached to a second bulb or LED, or second reflector and liquid crystal screen coloured red or direct to a second bulb or LED or second reflector and liquid crystal screen coloured red. Here again a flasher unit may be provided associated with the second capacitor and the second bulb or LED, or second reflector and screen. In these circumstances and with both an amber and a red light or reflection visible at the road signalling means and preferably flashing, not only is the driver of a vehicle warned of the presence of a vehicle in advance, but is additionally warned that the vehicle in advance is in very close proximity. As an alternative to the provision of separate bulbs/LEDs coloured orange or red, bulbs/LEDs coloured green and red can be provided. The charge from the capacitor can be applied to both bulbs/LEDs with higher current to the green than to the red, to provide a combined output of orange, and in the circumstance where an overflow charge is present an equally high current is allowed to reach the red bulb/LED to bias the output from orange to red.

To provide a road signalling means of even greater versitility, still further bulbs or LED's, or reflectors and overlying screens may be provided, and connected to the capacitor by an appropriate switch means. Thus, a blue bulb or LED, or blue reflector and screen may be provided with a switch means triggered by a temperature sensing means. Thus, if a sensed temperature is at a level where ice on the road may reasonably be expected, the switch is closed and the charge from the capacitor directed to the blue bulb or LED or reflector and screen preferably via an intervening flasher unit in addition to the amber and/or red bulb, LED or reflector and screen mentioned above, to warn following traffic of the danger of possible icy conditions and/or the presence of a vehicle ahead. Equally, said switch means may be a type closed by the presence of water, with activation of the appropriate bulb or LED or reflector and screen of an appropriate colour to signal the possible presence of surface water that might cause aqua-planing.

As a still further possibility within the scope of the present invention, road signalling means may comprise one or more lamps to be illuminated by such as a solar cell and capacitor as has been discussed above, the lamp(s) being overlaid by liquid crystal screen means of an appropriate number of different colours. Here and in similar manner to what has been discussed above, the headlights of a first vehicle playing on the road signal means would charge the capacitor to render transparent an amber sector of the screen, to warn a vehicle behind of the presence of the vehicle in front. If the headlight of the second vehicle plays on the road signal means before its capacitor has discharged, an overflow charge can pass to a second capacitor to open a red sector of the screen and give a warning of the close proximity of a vehicle in front. The screen may have a blue sector to be activated by the capacitor via switch means that are temperature controlled to enable the emission of a blue signal to give warning of ice, and may have a still further sector of an appropriate colour activated by switch means sensitive to the presence of water and to give warning of the possible presence of water on the road surface.

Road signalling means as mentioned above are of considerable assistance to vehicles behind a lead vehicle. In accordance with a further aspect of the present invention, and to provide signals to a lead vehicle, a renewable battery source may be provided, either of a removable type for periodic recharging, or of the type capable of being charged by solar power.

When a renewable battery source is provided the additional facility of providing early warning to drivers can be arranged. Thus, it is possible to provide an appropriate transmitting and receiving device at each road signalling means, and whereby on activation of a road signalling means the transmitter can be activated to signal a receiver in road signalling means to a predetermined distance behind a lead vehicle and sufficient to comprise a safe braking distance and whereby those signalling means rearwardly of a lead vehicle are activated to issue the same signal. Thus, power from the renewable battery source can be directed to the bulb or LED or liquid crystal screen of the signalling means via either the temperature activated switch or the switch closed by the presence of water, and simultaneously its transmitter activated to signal the receivers in the signalling means rearwardly in the direction of traffic flow, said receivers activating appropriate switches between its renewable battery source and its bulbs or LED's or liquid crystal screens and whereby the possible presence of ice and water can be signalled to drivers well in advance of it potential location. Equally possible is the provision of detector means in the road signalling means able to sense the presence of a stationary vehicle in close proximity to it to activate its transmitter and whereby road signalling means behind such stationary vehicle can be activated to warn approaching traffic behind that stationary vehicle.

Another source of potential danger to road users is the effecting of an overtaking manoeuvre on ordinary two lane roads in circumstances of poor visibility. Thus, in the embodiment of the invention where transmitting and receiving means are provided the headlights of a vehicle travelling in one direction and played on to the road signalling means, may cause the transmission of a signal to be picked up by the receivers of road signalling means in advance of that vehicles position and activate lamps or LED's or liquid crystal screens in those road signalling means, to give an appropriate warning to traffic to one side of the road of the presence of a vehicle in advance and on the other side of the road to warn such traffic of the danger of attempting an overtaking manoeuvre at that time. With the form of construction involving the presence of a transmitter and receiver, still further possibilities are provided by the invention. Thus, and for example, vehicles themselves can be provided with appropriate receivers, and to receive information regarding the presence of vehicles ahead, and road conditions such as the presence of ice or water. Equally, the signalling means could be available to emergency services, provided with appropriate transmitters to activate the signalling along a stretch of road.

Also feasible is the provision of advance warning to vehicles approaching such as traffic lights, pedestrian crossings, railway crossings and the like. Here, it would be the provision of an appropriate transmitter, sited at the traffic lights, pedestrian crossing, railway crossing and the like, to be activated as they switch, but more preferably as they are about to switch, to a traffic stop condition, and to cause the activation of a number of signalling means in advance to warn an approaching vehicle of a stop condition ahead.

To prevent the presence of an illuminated or reflected signal in normal daylight conditions, an overriding switch means may be provided to prevent activation such as by the presence of bright sunlight. Preferably, a detection means for ambient light conditions is provided to raise or lower the threshold at which automatic signalling can occur, so that with such as fog existing during daylight, a vehicle headlight will be above a threshold set by the detector and when signalling will occur.

Conveniently the road signalling means of the invention can be located within relatively conventional road mounted reflector units. Equally, the signalling means of the invention may be formed as a discrete unit that may be attached to a road side post, or may be attached to such as an existing road work pillar.

Embodiments of the invention will now be described purely by way of example only, with reference to the accompanying drawings, in which.

Figure 4:
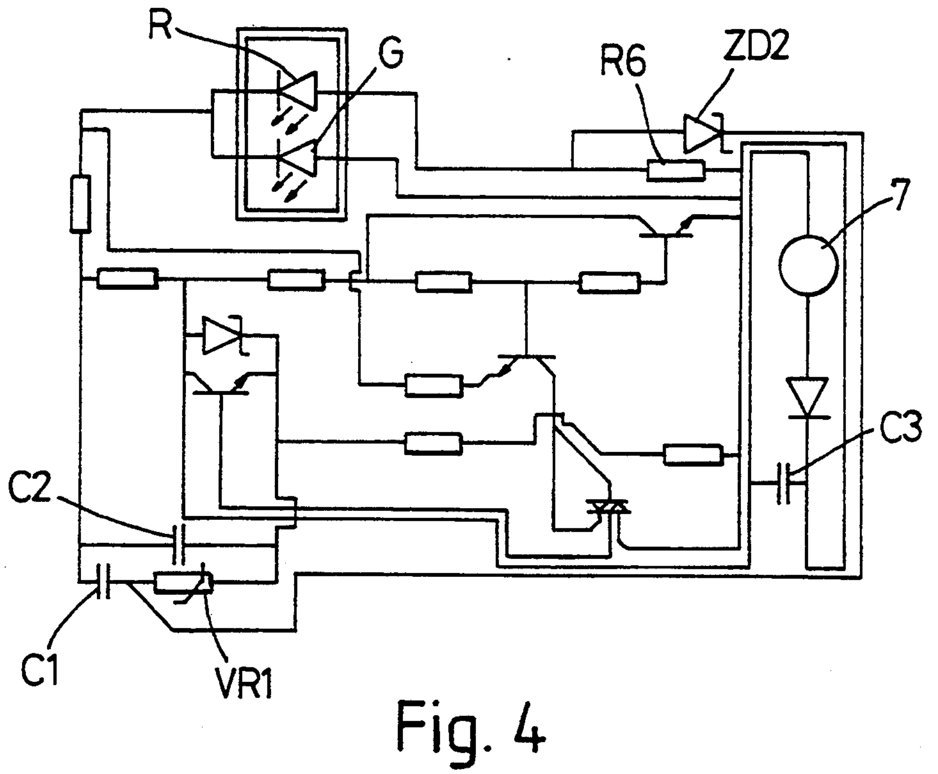
FIG. 4 is a circuit diagram illustrating a way of achieving required activation of the LEDs of FIG. 1.
Figure 6:
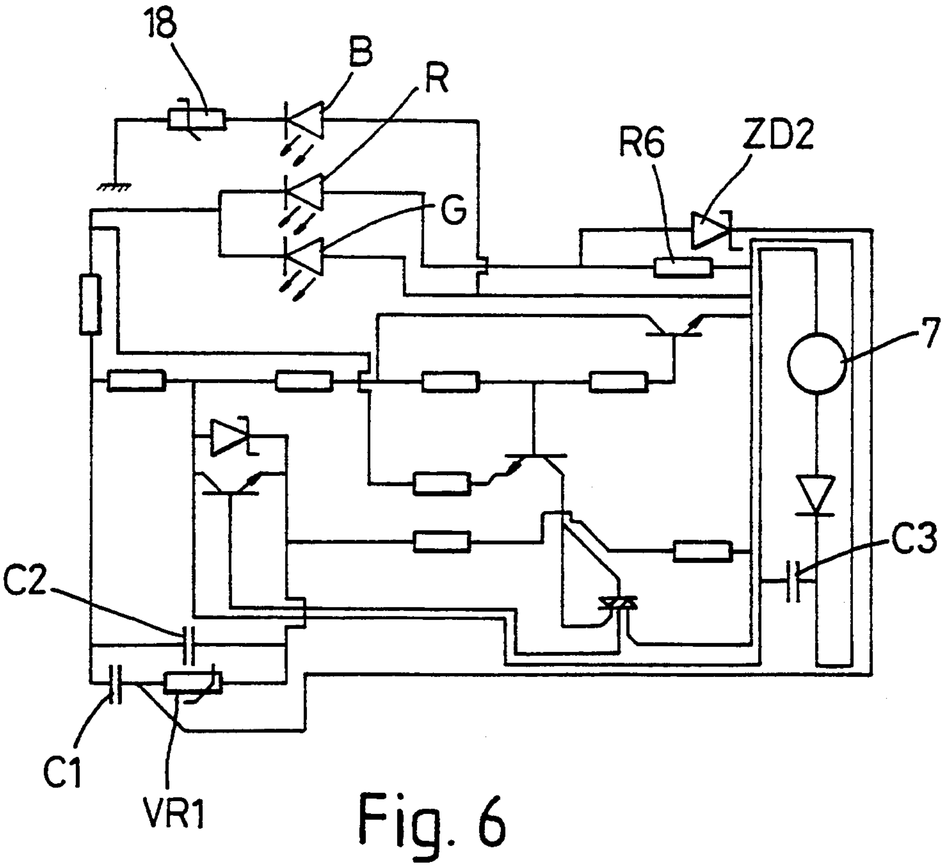
Figure 7:
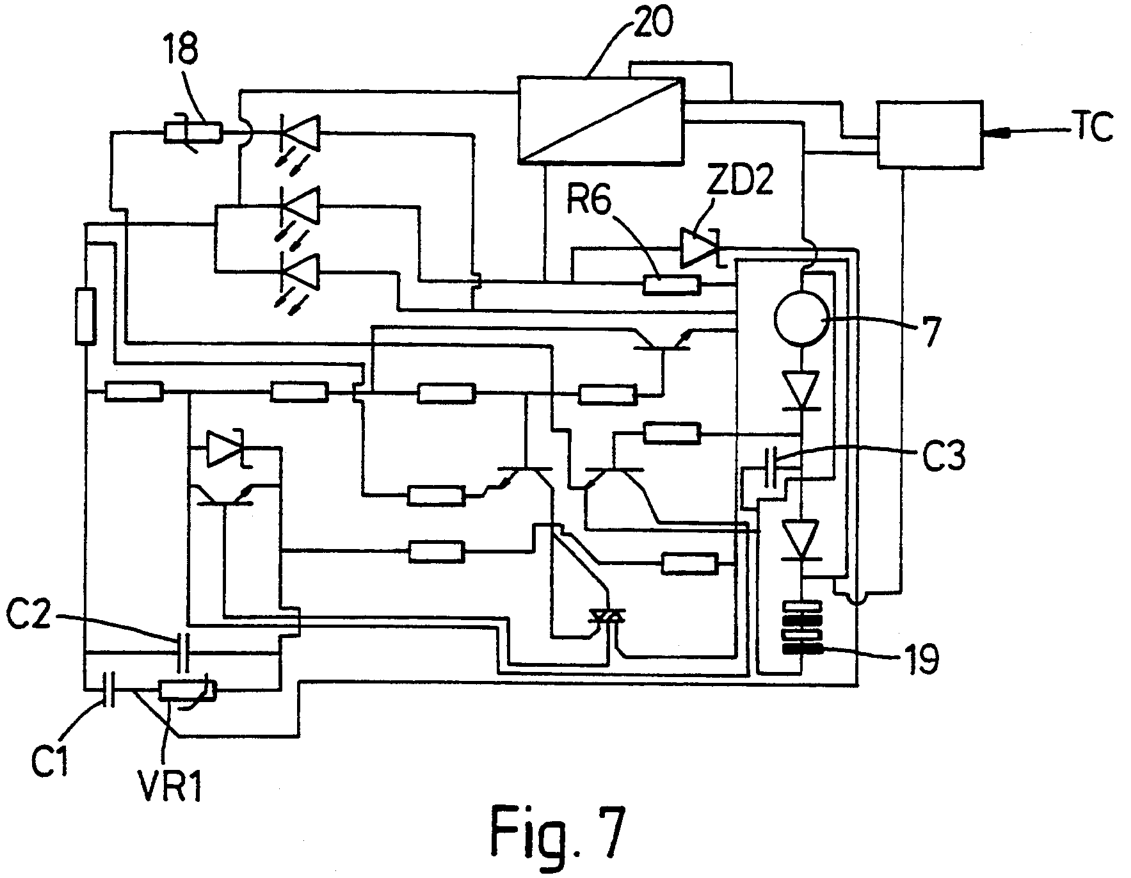
Figure 8:
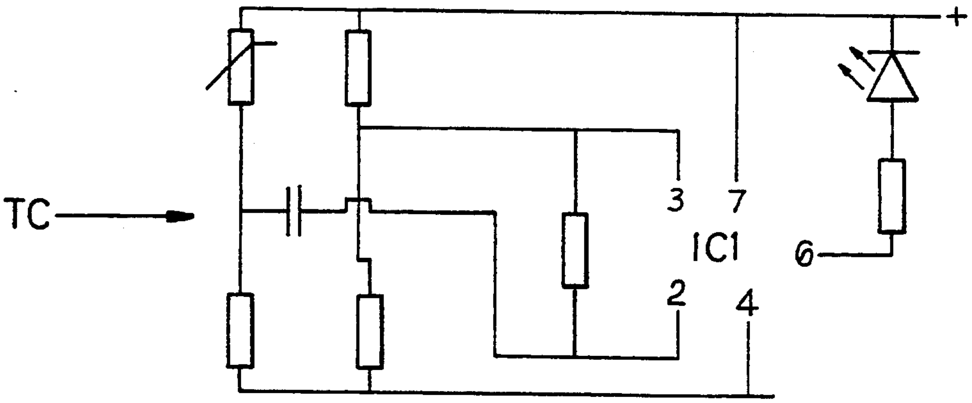

FIG. 6 corresponds to FIG. 4 but shows a circuit diagram incorporating surface ice/surface water detection means;

FIG. 7 is a circuit diagram illustrating a way of providing an auxiliary source of power and incorporating a transmitter/receiver;

FIG. 8 is a circuit diagram of a thermistor detector; and

Figure 9A:
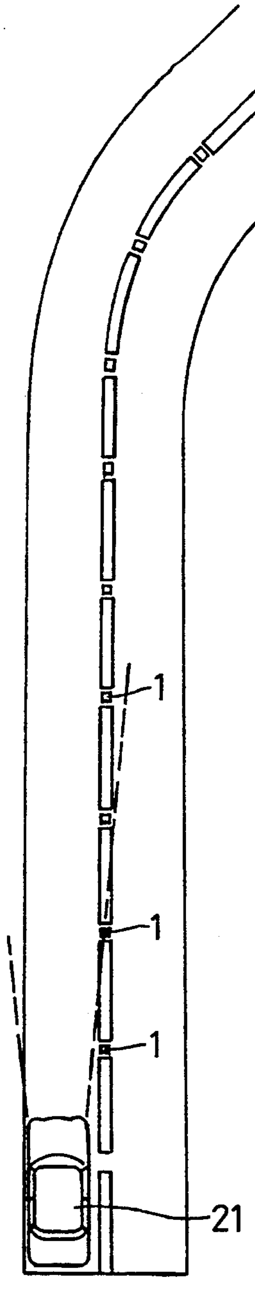
Figure 9B:
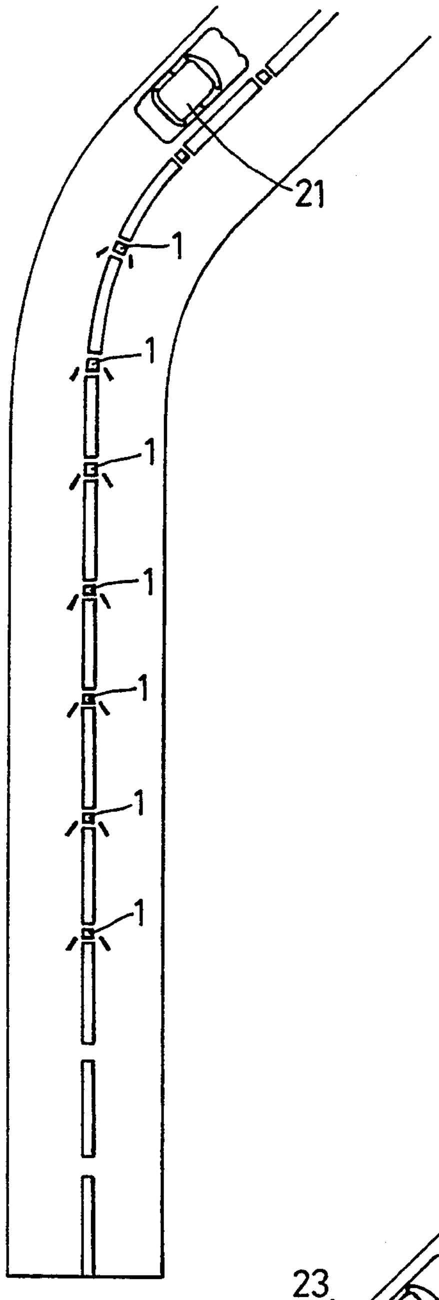
Figure 11:
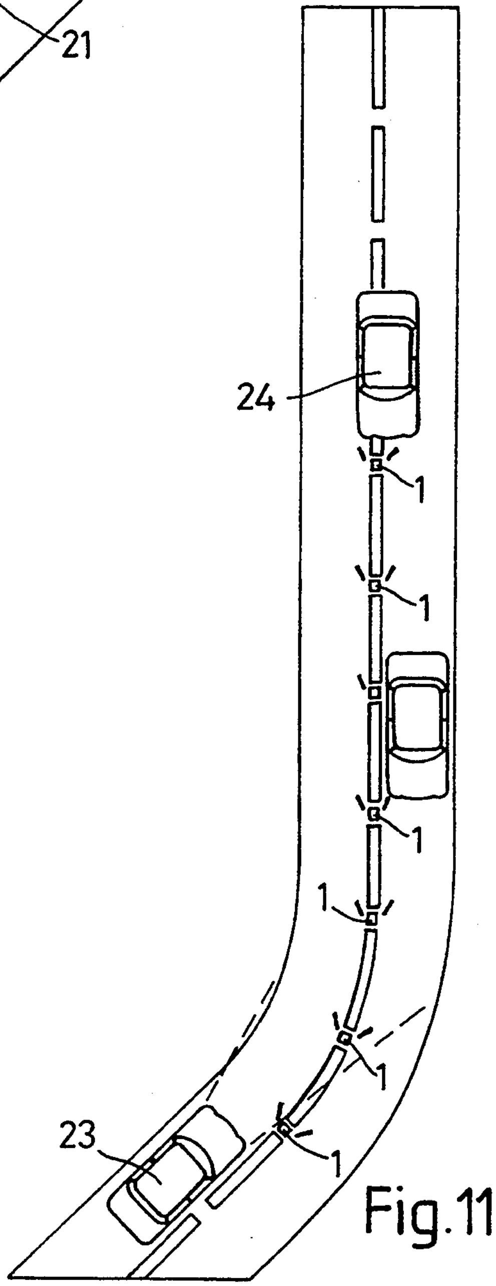
Figure 10:
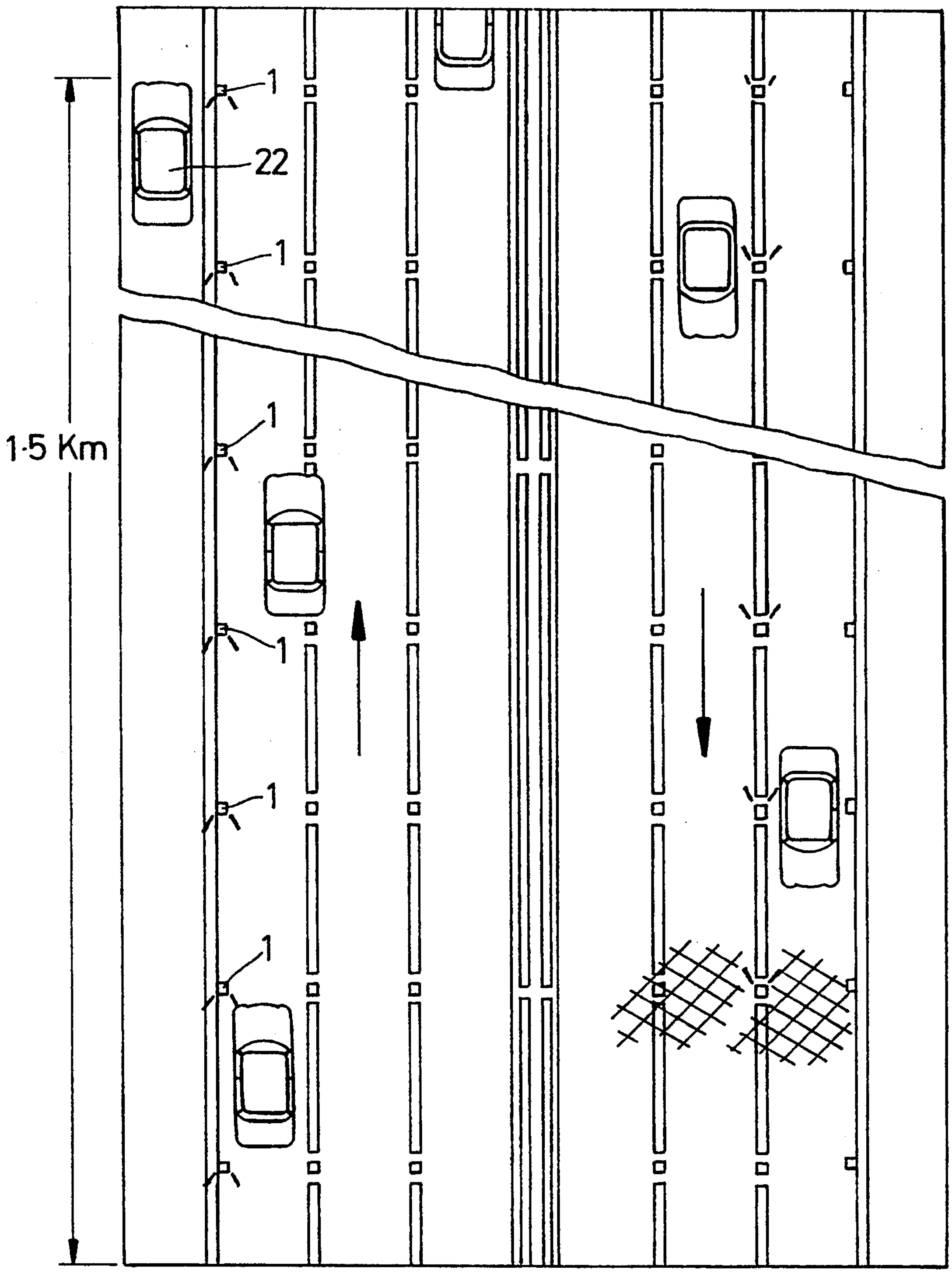
Figure 12:
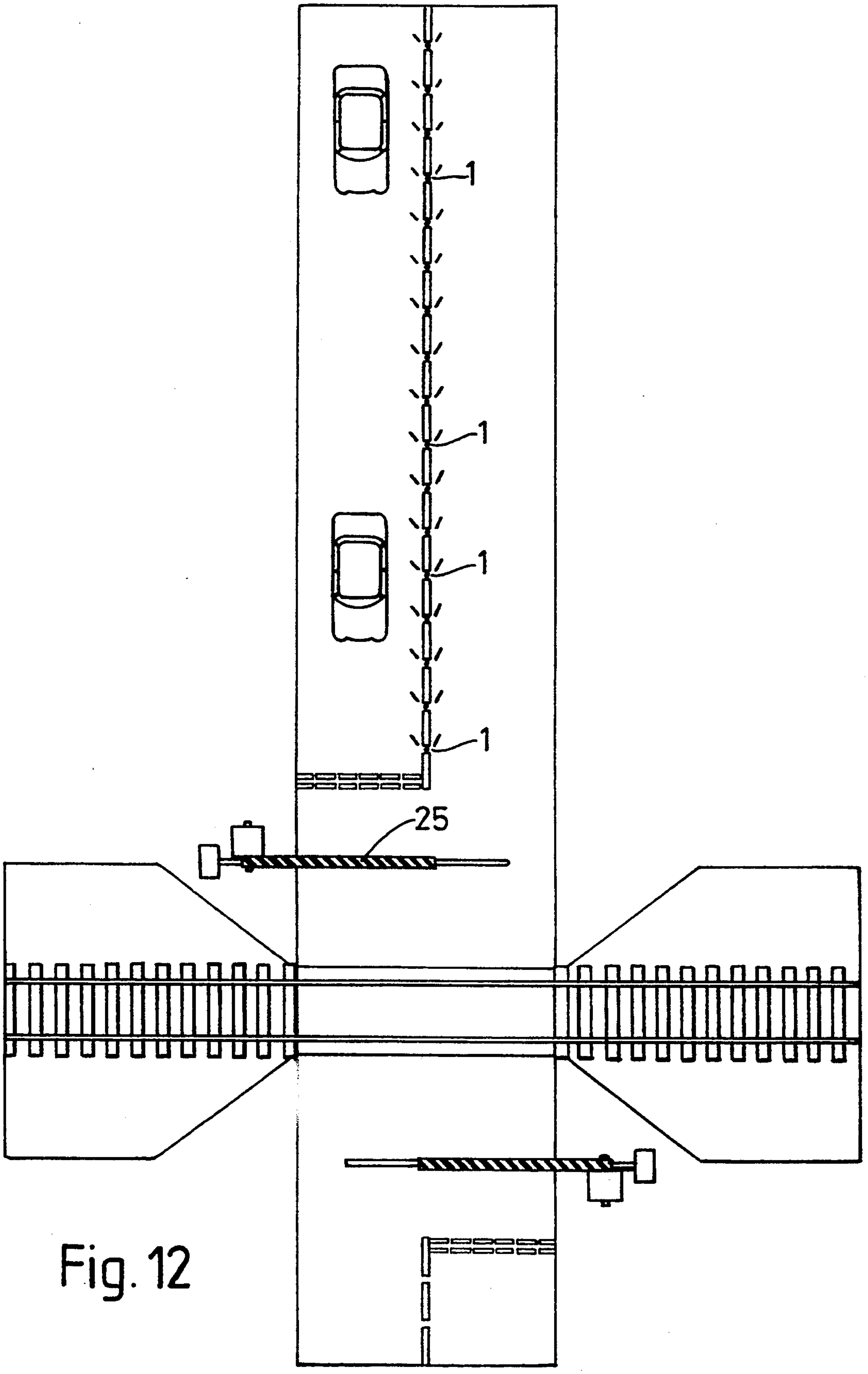

FIGS. 9A and 9B are a representation of a basic employment of the signalling means of the invention;

FIG. 10 is a representation of a further employment of a signalling means of the invention; and FIGS. 11, 12 are representations of still further employments of the signalling means of the invention.

Figure 1:
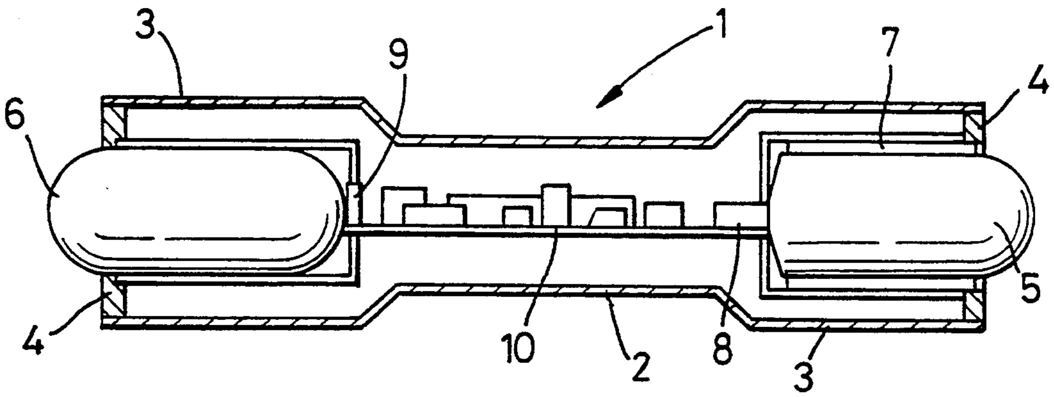
FIG. 1 is a schematic representation of signalling means in accordance with the present invention and employing LEDs.

In FIG. 1, a signalling means 1 has a body 2 of generally tubular shape and formed, e.g. from copper, with enlarged and sections 3, within the end sections 3 are ring inserts 4 again formed e.g. from copper, within which are located glass lenses 5, 6. Surrounding the lens 5 is a series of solar cells 7, and behind the lens 6 are a number of LED's 8. To the opposite end, and behind the lens 6 is a photoresistor 9.

Within he body 2 is the circuitry to provide for control over the LED's, which may be in the form of a printed circuit board 10, that can incorporate, or in the alternative, can be substituted by, an appropriate silicon chip bearing required circuitry.

The body 2 can be strategically located on the road surface, for example in conjunction with road mounted reflectors of conventional construction by extending through the support member of its reflective studs, to leave the lenses 5 and 6 exposed, or located on posts adjacent the road. In either instance, the lens 5 faces oncoming traffic to gather light from vehicle headlights, the lens 6 gathering ambient light and directing it to the photoresistor 9, for the purposes further explained below.

Figure 2:
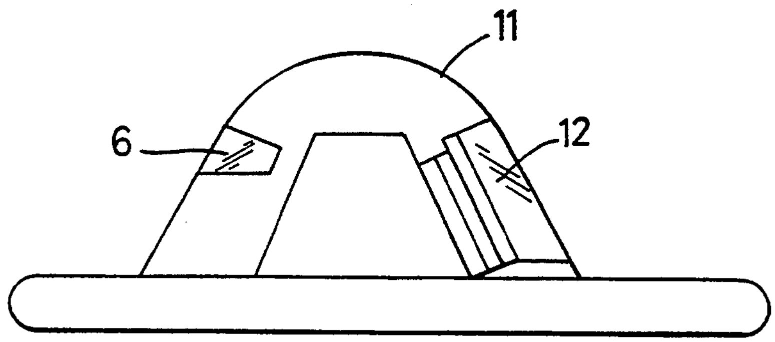
FIG. 2 is a schematic representation of signalling means in accordance with the invention, and employing reflectors with an overlaid liquid crystal screen.
Figure 3:
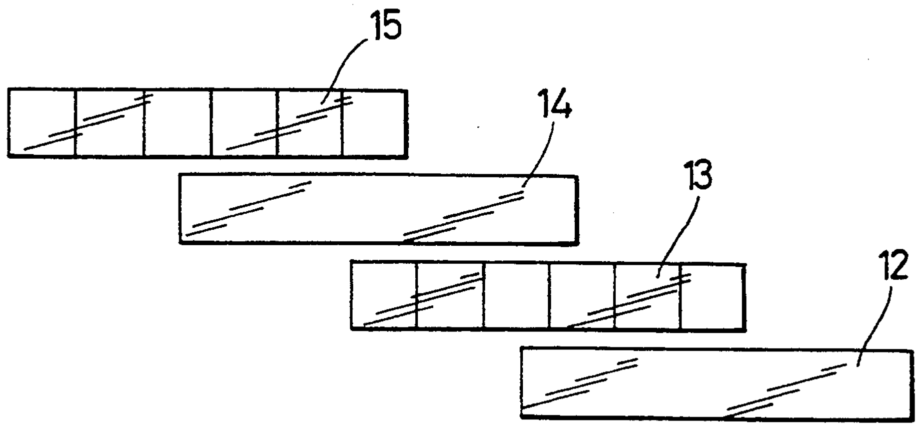
FIG. 3 shows in exploded form the essential elements of the signalling means of FIG. 2.

In FIG. 2, a body 11 for strategic location on or adjacent the road is provided such as to contain a printed circuit board or an appropriate silicon chip, bearing required circuitry. To one side of the body 11 a glass lens 12 of polarised glass, is provided, and behind which, as is indicated by FIG. 3, there is a liquid crystal blanking plate 13, a further polarised glass lens 14, and a multi-colour reflective plate 15. Behind the lens 12, a solar cell is located in similar manner to that depicted in FIG. 1. To the opposite side of the body, a further lens and associated photoresistor is provided, in similar manner to FIG. 1.

As is shown by FIG. 4, a basic circuit for control of the LED's of FIG. 1 or the liquid crystal blanking plate of FIGS. 2 and 3 incorporates the solar cells 7 of FIG. 1. Light playing on the solar cells 7 from a vehicle headlight creates electrical energy that is passed to a charge capacitor C3. The charge is held on the capacitor until a variable resistor VR1 ceases to detect light (i.e. when the vehicle has passed). During the period the light is playing on the solar cells 7, the variable resistor VR1 passes energy to a capacitor C1 at a slow rate. When the resistor VR1 ceases to detect light, energy from the capacitor C3 is passed to a capacitor C2, from where it is pulsed at a high current to a first, green, LED G, via a monolithic oscillator. At the same time a lower current is passed via a resistor R6 to a second, red, LED R, the outputs from the two LED's combining to provide an orange flashing display. Thus, any second vehicle behind a lead vehicle, reaching a road signalling means emitting an orange flashing display, is automatically advised of the presence of a vehicle ahead.

The charge to the capacitors C1 and C2 and hence the duration of a flashing signal maintained, is a function of the time that light from a vehicle headlight is playing on the solar cells 7, and hence is a function of the speed of the vehicle. It results in a trail of flashing signals behind a lead vehicle of a length that is a function of its speed, but always of a sufficient length such that the first flashing signal visible to a vehicle behind the lead vehicle provides an adequate braking distance between the lead and a second vehicle.

In the circumstance where a second vehicle is close behind a lead vehicle, its headlights playing on the solar cells 7 of an already flashing signal means, causes current passed from the variable resistor VR1 to the capacitor C1 to reach a threshold point, and when the Zener diode ZD2 allows current to bypass an associated resistor R6 to direct high current to the second, red, LED R, to bypass the visible signal from flashing orange to constant red, and hence warn the second vehicle of the very close proximity of a vehicle in front. It will readily be understood that a red, green, and blue LED can be combined into a single unit, and current controlled to each to provide the required coloured output.

Figure 5:
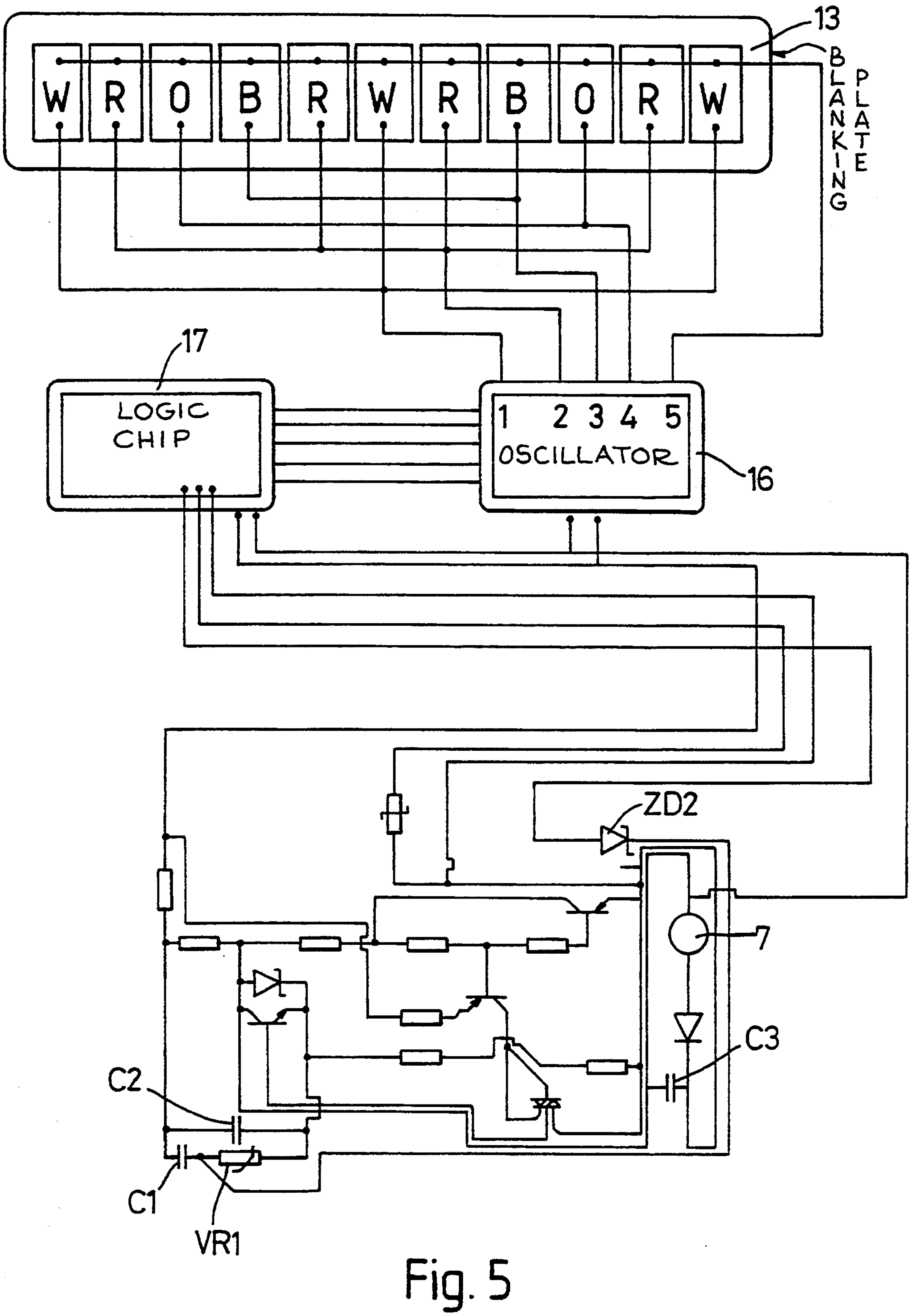
FIG. 5 is a circuit diagram illustrating a way of achieving required activation of the liquid crystal screen of FIG. 2.

As is indicated in FIG. 5 where the basic circuit is as is shown in FIG. 4, greater control can be provided over the liquid crystal blanking screen by providing a logic chip 17 and to provide constant reflection if required or the flashing reflection at any required frequency as may be desirable. Here, the same would apply to the signalling means of FIG. 1 and the circuit diagram of FIG. 4 where the logic chip can be included in the circuit directly in advance of the LED's. As is shown particularly by FIG. 5, the reflector has a collection of white, red, orange and blue sectors for appropriate activation.

The same considerations apply to the signal means of FIG. 2 and 3. Here the situation is that in the absence of a charge on the capacitor C1, there is the absence of a current to a first sector of the liquid crystal blanking plate 13, and a second sector of the blanking plate, each of which, respectively, is aligned with a first orange and a second red sector of a multi-coloured reflector plate 15. In substantially similar manner to the control over the LED's of FIG. 1, and as is shown by the circuit diagram of FIG. 5, energy from the solar cells 7 passes via the variable resistor VR1 to the capacitor C1 at a slow rate. When VR 1 ceases to detect light, energy from the capacitor C3 is passed to the capacitor C2 from where it is pulsed at a high rate via a oscillator 16 to the sector of the blanking plate overlying the orange reflector. Current applied to that sector causes an orientation of the crystals to allow the passage of light to the reflector and back from the reflector. Thus, whilst active, the headlights of a second vehicle playing on the signal means causes the production of a flashing, orange, reflected signal, to warn the second vehicle of the presence of a vehicle in front. When a second vehicle is closely behind a lead vehicle, the result again is current to be passed from the variable resistor VR1 to the capacitor C1 to reach a threshold point, and when the Zener diode ZD2 allows current to bypass the associated resistor R6 to direct current to a second sector of the blanking screen to orient its crystals to allow the passage of light and expose a red sector of the reflector. Thus, the headlights of a second vehicle cause the presence of both a flashing orange and constant red reflected signal, to warn the second vehicle of the close approach of the vehicle ahead.

As is shown in FIG. 1, there is the lens 6 behind which is the photoresistor 9 the purpose of which is to sense ambient light conditions at the location of a signalling means of the invention. In normal light conditions, and when the signalling means of the invention is not required, the photoresistor serves as a switch to prevent the activation of the LED when the light conditions above a predetermined threshold level, and allow the activation of the LED when the light conditions below the predetermined threshold level. During the hours of darkness or inclement weather when poor visibility conditions prevail, insufficient light is played on the photoresistor rendering it inactive and allowing the operation of the LED's or the liquid crystal screen as required.

To provide additional facilities on the signal means of the invention, as is shown by the circuit diagram of FIG. 6, additional LED's or reflective screen and liquid crystal blanking plate sectors can be provided. For example, and as is shown, a third, blue, LED, B, or when considering FIG. 2, a third sector of the blanking screen, can be provided overlaying a third blue sector of the reflector plate. Thus, by providing a sensor 18, such as a temperature sensor, or a sensor for detecting the presence of surface water, switch means incorporated in the sensor are activated to allow the illumination of the blue LED, or orient the crystals of the sector of the blanking plate overlaying the blue sector of the reflector plate to permit the passage of light and whereby to provide a blue signal to warn an approaching vehicle of the danger of ice or surface water.

The benefits of the signal means of the invention can be enhanced considerably by the provision of an auxiliary source of supply. Thus, as is shown by FIG. 7, auxiliary, rechargeable batteries 19, are provided, but which could equally be memory back-up capacitors, connected in the circuit to the solar cells 7. The batteries should be of the type having an inherently long life to guard against prolonged periods of poor ambient light conditions, where insufficient power is provided by the solar cells to recharge them.

The provision of an auxiliary source of power enables the provision of a transmitter/receiver 20 on each signal means, such as for example an infra red transmitter and receiver of relatively conventional character. This enables any one signal means to cause the activation of other signal means in either a forward or rearward direction. For example, with the provision of a thermistor circuit as shown in FIG. 8, a signal means of the invention can sense the presence of either very slow traffic moving past it, or a stationary vehicle alongside it. The thermistor circuit causes the activation of the transmitter of that signal means to send a signal to the receivers of rearwardly located signal means to activate its red LED or red reflector, and to warn oncoming traffic of the possibility of stationary traffic ahead. Equally the sensing of ice or water on a road can be transmitted to other receivers rearwardly in the direction of traffic flow.

Of equal importance is to guard against dangerous overtaking manoeuvres in poor light conditions. Thus, headlights of a vehicle playing on a sensing means can cause the activation of its transmitter to send a signal to the receivers of signal means ahead of it in the direction of its travel, to warn an oncoming driver of the presence of a vehicle on the other side of the road. The oncoming vehicle may already have visible signals, orange, red or blue, visible on signal means facing it. It is therefore preferred to provide a fourth LED or fourth coloured sector on a reflective screen to provide such as a violet signal to warn of oncoming traffic on the other side of the road.

The basic employment of the signalling means of the invention is shown in FIGS. 9A and 9B. As is shown in FIG. 9A the headlights of a vehicle 21 illuminate a number of signalling means 1 ahead of it in the direction of travel to charge their respective capacitors. As is shown by FIG. 9B, there is left behind that vehicle a trail signalling means with either its orange LED illuminated or its orange sector of its reflective screen exposed until the respective capacitors are discharged. The capacitor of any one signalling means is a function of the speed of the vehicle the headlights of which are illuminating it and such that the signalling means is maintained active for a period of time after the passing of the vehicle that is a function of the vehicle's speed. As a consequence, the trail of active signalling means behind the vehicle will always provide a warning to traffic behind at a safe braking distance.

In the form of construction embodying a transmitter/receiver, and as is indicated in FIG. 10, a signalling means 1 can sense the presence of a stationary vehicle 22 and to cause the activation of a number of signalling means rearwardly of it to a distance dictated by the range of the transmitter and which could, for example, activate signalling means up to 1.5 kilometres behind the stationary vehicle. Similar considerations apply to the rearward signalling of hazardous road conditions such as ice and water, where again signalling means up to 1.5 kilometres behind the location where ice/water is present, can be activated.

As is indicated in FIG. 11, and again in the form of construction where a transmitter is provided, activation of the signalling means by the headlights of a vehicle 23 can cause the activation of signalling means in advance of it and facing the oncoming traffic to activate such as its violet LED or violet sector of its reflective screen to warn an oncoming vehicle 24 of the presence of the vehicle 23.

Also possible is the provision of a transmitter on such as traffic lights, pedestrian crossing lights, or railway crossings. Here, and as is shown in FIG. 12, the arrangement is that marginally in advance of stop lights or a barrier 25 at a railway crossing being activated (which could equally be traffice lights or pedestrian crossing lights and at the point that they are about to go to red), the transmitter signals a number of signalling means 1 on the approach to the lights or crossing to cause activation of their red LED's or open their red reflectors, to warn oncoming traffic that the lights of traffic control are about to switch to stop or a barrier immediately ahead is about to close.

Further important possibilities lay in the provision to emergency services such as the police, fire brigade, or ambulance services of transmitters capable of activating the signal means of the invention, such that they can activate signal means along a required stretch of road for any required purpose.

With the provision of a transmitter and receiver on the signal means of the invention, whilst a primary consideration is the signalling and activation of other signal means ahead of and behind a lead vehicle as has been mentioned above, the transmitter can be arranged to transmit signals to remote receivers. Those receivers could be mounted roadside to gather information regarding ambient light, road traffic density and road surface conditions. Equally the receivers could be mounted within vehicles with associated equivalent circuitry and LED's to create visible and/or audible signals within the vehicle equivalent to those created on the signal means themselves.

I claim:

1. A signalling device (1, 11) comprising; visible signal means (8; 13, 15) for producing a visible signal; and at least one chargeable means (7, C3) for charging to a degree determined by the length of time that light from a passing vehicle headlight illuminates said at least one chargeable means, and for activating said visible signal means (8; 13, 15) for a period of time determined by the degree to which said at least one chargeable means has been charged by said headlight illumination, after said headlight has ceased to illuminate said at least one chargeable means (7, C3) and until said at least one chargeable means (7, C3) has discharged.

2. A signalling device as in claim 1, characterised in that said chargeable means comprises a photoresponsive cell (7) to receive light from said headlight and one or more capacitors (C1, C2, C3) chargeable by said photoresponsive cell.

3. A signalling device as in claim 1 or claim 2, characterised in that the visible signal means is a lamp means (8), in the form of one or more bulbs, or one or more light emitting diodes.

4. A signalling device according to claim 1 further comprising; a detector means (VR1) is provided for sensing the presence of light from the vehicle headlight being directed at the signalling device, the arrangement being such that when the detector means (VR1) ceases to detect light from the vehicle headlight, energy from the chargeable means (7, C3) is passed to a second chargeable means (C2) from where it is passed to said visible signal means (8; 13, 15), to maintain a signal on the signalling means until said chargeable means (C3) has been discharged.

5. A signalling device as in claim 1 characterised in that one or more sensor means (18) are provided along with three or more said visible signal means (8; 13, 15) to provide further required output colors on the signalling means following activation of the sensor means.

6. A signalling device as in claim 1 characterised in that light sensitive means are provided to sense ambient light conditions above a predetermined threshold to prevent activation of the signalling device when ambient light conditions are above said threshold, and allow activation of said signalling device when ambient light conditions are below said threshold.

7. A signalling device as in claim 1 characterised in that a transmitter receiver means (20) is provided to enable a first said signalling means to activate a second said signalling device located either in advance of or behind said first signalling device in the direction of flow of vehicles.

8. A signalling device as in claim 7 characterised in that a remotely located transmitter means is provided to activate a plurality of said signalling device located over a length of road on which the signalling device are installed.

9. A signalling device according to claim 1 further comprising:

directing means for directing said chargeable means along a roadway for impingement by illumination from said vehicle headlight on said roadway.

10. A signalling device according to claim 9, wherein said directing means comprises a support structure projecting into the roadway.

11. A signalling device (1, 11) comprising:

comprising a first and a second visible signal means, visible signal means (8; 13, 15) for producing a visible signal; and at least one chargeable means (7, C3) for charging to a degree determined by the length of time that light from a passing vehicle headlight illuminates said at least one chargeable means, and for activating said visible signal means (8; 13, 15) for a period of time determined by the degree to which said at least one chargeable means has been charged by said headlight illumination, after said headlight has ceased to illuminate said at least one chargeable means (7, C3) and until said at least one chargeable means (7, C3) has discharged, a detector means (VR1) for sensing the presence of light from the vehicle headlight being directed at the signalling device, the arrangement being such that when the detector means (VR1) ceases to detect light from the vehicle headlight, energy from the chargeable means (7, C3) is passed to a second chargeable means (C2) from where it is passed to said visible signal means (8; 13, 15), to maintain a signal on the signalling device until said chargeable means (C3) has been discharged, and further chargeable means (C1) is provided for electrical energy from photoresponsive cells (7) being simultaneously directed to said further chargeable means (C1) at a slow rate, additional to energy being passed to said chargeable means (C3) during the period that the detector means (VR1) senses the presence of said vehicle headlight directed at said signalling device, and when the detector means (VR1) ceases to detect light, energy from said chargeable means (C3) is passed to the second chargeable means (C1) from where it is passed to said first visible signal means (8; 13, 15) at one, higher rate, whilst energy from the further chargeable means (C1) is passed to said second visible signal means (8; 13, 15) at a second lower rate, each of said visible signal means and second visible signal means being of a different color to be combined to emit a required output color from the signalling device.

12. A signalling device as in claim 10, characterised in that when a further charge is applied to said chargeable means (7, C3) before said chargeable means have discharged, electrical energy passed to the further chargeable means (C1) is caused to reach and exceed a predetermined threshold, beyond which electrical energy is allowed to be directed to one of said first and second visible signal means (8; 13, 15) at a higher rate to change said output color to a second output colour.

13. A signalling device comprising:

visible signal means for producing visible signals;

chargeable means for charging to a degree determined by a length of time that a light from a passing vehicle headlight illuminates said chargeable means and for activating said visible signal means for a period of time determined by the degree to which said chargeable means has been charged by said headlight illumination, after said headlight has ceased to illuminate said chargeable means and until said chargeable means has discharged, wherein said visible signal means is provided by a reflective plate (15) overlaid by a liquid crystal blanking plate (13) that is rendered transparent or opaque by the presence or absence of a charge on said chargeable means (7, C3).

14. A signalling device as in claim 13, characterised in that said reflective plate (15) has sectors of different color, and said liquid crystal blanking plate 13 has separate sectors each to overlie a respective sector of the reflective plate to be rendered transparent selectively or in combination to provide one or more reflected signals of a required color.

* * * * *